Figure 3:
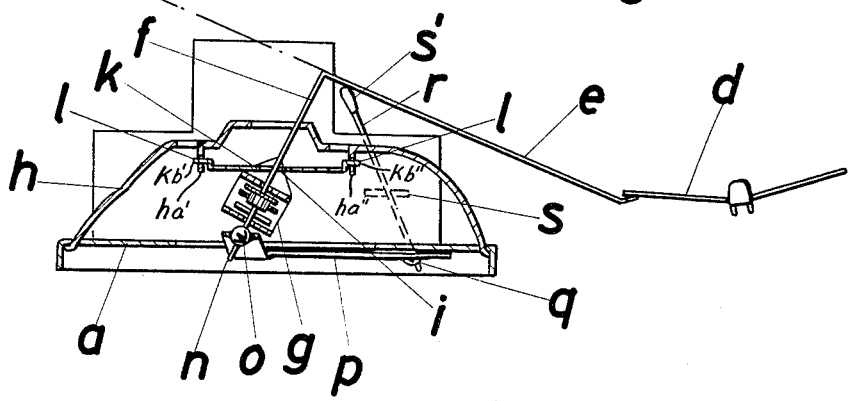

Oct. 11, 1966 A. EINFALT 3,278,183
TOY FOR SIMULATING THE FLIGHT OF A TETHERED AIRPLANE
Filed June 25, 1964 2 Sheets-Sheet 1
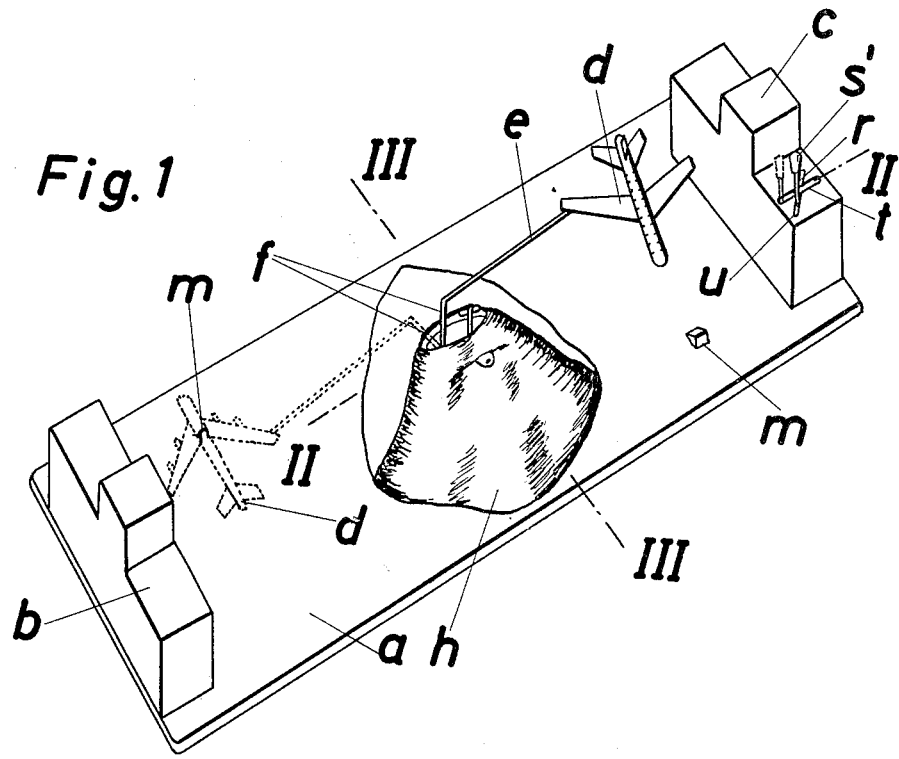
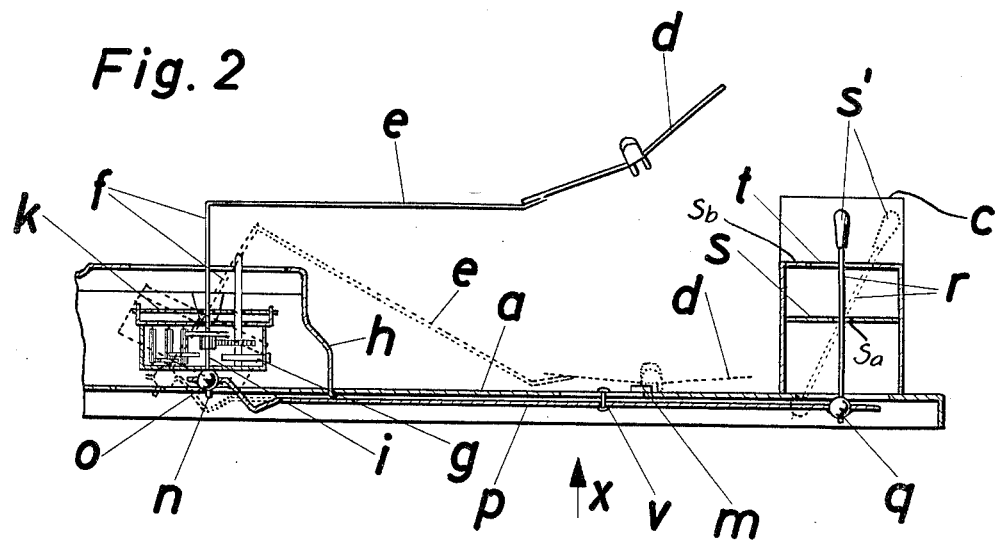
Inventor:
Alfred Einfalt
By Kenyon, Palmer,
Stewart & Estabrook
Attorneys Oct. 11, 1966  A. EINFALT  3,278,183
TOY FOR SIMULATING THE FLIGHT OF A TETHERED AIRPLANE
Filed June 25, 1964  2 Sheets-Sheet 2

Inventor:
Alfred Einfalt
By Lemon, Palmer,
Stewart & Estabrook
Attorneys

United States Patent Office 3,278,183
Patented Oct. 11, 1966

3,278,183
TOY FOR SIMULATING THE FLIGHT OF A TETHERED AIRPLANE
Alfred Einfalt, Nurnberg, Bavaria, Germany, assignor to Gebruder Einfalt, Nurnberg, Germany
Filed June 25, 1964, Ser. No. 377,920
Claims priority, application Germany, Feb. 22, 1964, E 26,463
4 Claims. (Cl. 272—31)

The invention relates to a flying toy with an arm which carries a toy aircraft and is moved in a circle as well as up and down by means of a driven shaft.

In the case of such flying toys it is not merely a question of the aircraft flying round in a circle but it must also be able to fly at different heights as well as land and take off. Only then does it become sufficiently interesting as a toy. The flying, landing and taking off should be controllable by the child playing with the toy.

In the known flying toys the above-mentioned conditions are only met by an excessive amount of mechanical equipment. As a result they are not only expensive to produce and assemble but their function is likewise not sufficiently reliable.

To overcome this objection the construction according to the invention is so designed that the driven shaft for the arm carrying the aircraft can swing up and down in two planes at an angle to each other, whereby the clockwork mechanism driving the shaft participates in this movement. Consequently the mechanism is mounted so that it can swing about an axis on a carrier plate which in turn can swing about an axis extending at right angles to the first axis and at the same time is mounted on a stationary part, for example a tower or an imitation mountain on the toy.

The swinging of the driven shaft and its driving mechanism is effected according to another feature of the invention by an adjustable or movable lever engaging a pin or journal on the under side of the driving mechanism through the intermediary of a ball joint and is connected with an operating lever by another ball joint. The operating lever preferably has two arms and is mounted to pass loosely through a hole in a transverse wall in a fixed part of the toy. One arm carries the ball joint for the adjusting lever while the other arm has a handle for manipulating the lever.

The construction is preferably so designed that the stationary part accommodating or supporting the clockwork mechanism, for example an imitation tower or mountain, is located between two simulated airports opposite each other which have locking members projecting into the path of flight of the landing aircraft.

Figure 4:
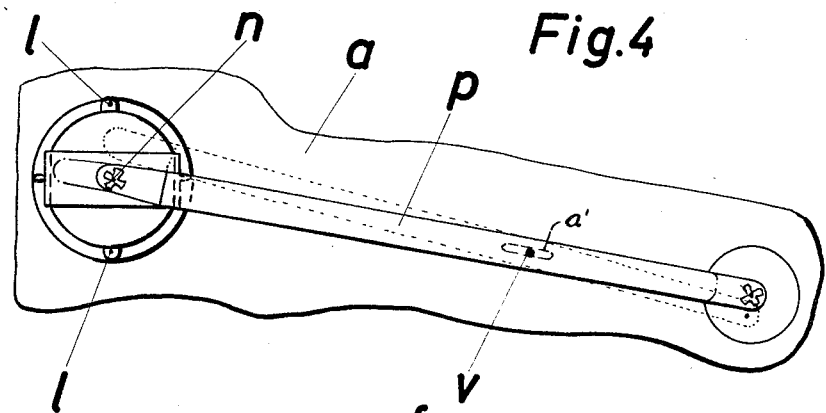
Figure 5:
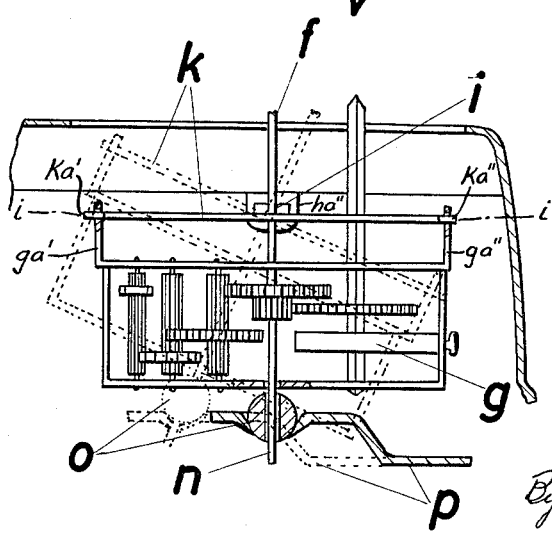

Further advantages and features of the invention are explained in the following description of the embodiment illustrated by way of example in the accompanying drawings in which:

FIG. 1 is a perspective birdseye view of the flying toy;
FIG. 2 a part section on line II—II of FIG. 1;
FIG. 3 a section on line III—III of FIG. 1;
FIG. 4 a view of the underside of the adjusting lever taken in the direction of the arrow $x$ in FIG. 2, and
FIG. 5 a part section on a larger scale showing the clockwork mechanism.

Two airports $b$ and $c$ are arranged opposite each other on a base plate $a$. They represent two stations between which the aircraft $d$ flies to and fro in a circular path.

The aircraft $d$ is mounted on a carrier arm $e$ driven by and mounted on a shaft $f$ which, as already mentioned, is capable of swinging up and down (or tilting to and fro) in two planes at an angle to each other.

The shaft $f$ is rotated by a driving mechanism $g$ which in the example illustrated is a spring-driven clockwork movement but for which a fractional-horsepower electric motor might be substituted. This driving mechanism $g$ is accommodated in a structure representing a landscape, in the example illustrated an imitation hollow mountain $h$ which is open at the top.

The driving mechanism $g$ is mounted within the hollow imitation mountain portion $h$, with the driving shaft $f$ extending out of the enlarged opening at the top of the portion $h$. The mechanism $g$ is mounted upon a carrier plate $k$ to be tilted about two horizontal axes arranged at right angles to each other, in order to effect tilting of the driving shaft $f$ in different directions. One tilting axis $i$ is provided by means of a pair of pivot points $ka'$ and $ka''$ extending from opposite edges of the plate $k$, and passing into openings in upwardly extending ears $ga'$ and $ga''$ formed on the frame of the driving mechanism $g$, see FIGURE 5. The second pivoting or tilting axis $l$ is provided by means of a pair of pivot points $kb'$ and $kb''$ extending from the remaining opposite edges of plate $k$ and engaging openings formed in downwardly extending ears $ha'$ and $ha''$ struck from the wall of the hollow part $h$, see FIGURE 3. It will be understood that tilting axes $i$ and $l$ are arranged at right angles to each other in the plane of the plate $k$, so that by tilting the driving mechanism $g$ about one or both of these axes, the shaft $f$ may be tilted in two different planes arranged at right angles to each other.

With the aircraft mounted on the carrier arm $e$ and with the swinging or tilting of the shaft $f$ the aircraft $d$ can consequently swing up and down so that it can fly high and low both in the direction of the section lines II—II and also in the direction of the section lines III—III. It can swing low enough to land at the airports $b$ and $c$. For this purpose these stations have locking elements $m$ supported on base $a$ in position to project into the path of movement of the landing aircraft. When the aircraft is landing the drive of the still running mechanism is preferably cut-out by means of a free-wheel mechanism which is known per se and therefore not described.

As already mentioned, the driving mechanism $g$ participates in the swinging movements of the driving shaft $f$. Consequently an adjustable lever $p$, which is connected with an operating lever $r$ through the intermediary of a ball-joint $q$, engages the journal $n$ of the driving mechanism $g$ through the intermediary of another ball joint $o$. Adjustable lever $p$ is pivoted intermediate its ends by a pivot pin $v$ mounted to extend into and be slidable within an elongated slot $a'$ formed in the base $a$ parallel with the lever $p$, see FIGURE 4. This operating lever $r$ is mounted to pass loosely through a hole $s_g$ formed in transverse wall $s$ of the airport building $c$. The lever $r$ has two arms and carries the ball joint $q$ on its lower arm and a handle $s'$ on its upper arm. The upper end of lever $r$ passes through the top horizontal wall $s_b$ of airport $c$ which is provided with two elongated slots $u$ and slot $t$, the two slots being arranged to intersect each other at an angle, such as an acute angle, see FIGURE 1.

If this lever $r$ is shifted along the guide slot $t$ out of the position shown in solid lines in FIG. 2 into the position shown in dotted lines, the lever $b$ will be shifted longitudinally with the result that the driving mechanism $g$ and the carrier arm $e$ assume the position also shown in dotted lines in FIG. 2. The aircraft $d$ then flies at a very low level in the region of the airport $c$ and at a very high level in the region of the airport $b$. It can even land at the airport $c$ as indicated also in dotted lines in FIG. 2.

If the lever $r$ is shifted out of its initial position along the guide slot $u$, the lever $p$ mounted with its pivot $v$ in the slot $a'$ will swing to and fro as shown in dotted lines in FIG. 4. The driven shaft $f$ with the carrier arm $e$ will then assume the inclined position shown in FIG. 3. The aircraft will therefore fly alternately at a high and low level at points on opposite sides of the axis joining the two stations *b* and *c*.

A glance at the drawings will show the constructional simplicity and functional reliability of the new flying toy. The many flying movements mentioned are rendered possible in a simple manner by the fact that the driving mechanism which carries the driving shaft *f* and supporting arm *e* can swing in two directions, whereby only one adjusting lever and one operating lever of the control element are required.

What I claim is:

1. A toy for simulating the flight of a tethered airplane, comprising a base representing a landscape having two spaced apart portions representing airports, a driving mechanism mounted on said base between said airport portions and having a rigid driving shaft mounted to rotate on a fixed axis with respect to the frame of said driving mechanism, an arm secured to the end of said shaft and extending laterally therefrom to have rotary movement over a circular area of said base between said airport portions, a toy aircraft secured to the end of said arm, whereby said aircraft travels in a circular path about said shaft and in a plane normal to the rotary axis of said shft, adjustable mounting means solely supporting said driving mechanism on said base in a substantially parallel plane with the plane of said base for tilting said mechanism from said substantially parallel plane into a plurality of planes forming acute angles with the plane of said base whereby the axis of rotation of said shaft is tilted in different directions, and control means located outside of the path of movement of said aircraft and controlling said adjustable mounting means to effect tilting of the axis of rotation of said shaft and thereby effect tilting of the plane of flight of said aircraft.

2. A toy according to claim 1 wherein said adjustable mounting means for supporting said driving mechanism on said base comprises a carrier plate, first pivot means securing the frame of said driving mechanism to said carrier plate for tilting said driving mechanism about a first tilting axis to tilt the axis of rotation of said shaft in one plane, and second pivot means for connecting said plate to said base for tilting said mechanism on a second tilting axis at right angles to said first tilting axis.

3. A toy according to claim 2 wherein said control means comprises a control lever mounted upon said base to be moved longitudinally and to be swung about a transverse axis, and means connecting one end of said lever to said driving mechanism to effect tilting about one axis in response to longitudinal movement thereof and to effect tilting about the other tilting axis in response to swinging movement of the lever.

4. A toy according to claim 3 including an operating lever connected to the other end of said control lever, said operating lever comprising a two-arm lever extending through an opening in a transverse wall of one airport, the lower arm of said operating lever being connected to said control lever, and the upper arm having a handle part mounted thereon.

References Cited by the Examiner

FOREIGN PATENTS

| | | |
|---|---|---|
| 1,107,938 | 8/1955 | France. |
| 1,292,821 | 3/1962 | France. |
| 499,330 | 11/1954 | Italy. |

RICHARD C. PINKHAM, *Primary Examiner.*

L. J. BOVASSO, *Assistant Examiner.*